United States Patent [19]

McNally et al.

[11] Patent Number: 4,999,787

[45] Date of Patent: Mar. 12, 1991

[54] HOT EXTRACTION AND INSERTION OF LOGIC BOARDS IN AN ON-LINE COMMUNICATION SYSTEM

[75] Inventors: Lance McNally, Townsend; Peter Morley, Pepperell; James W. Lotti, Marlboro, all of Mass.

[73] Assignee: Bull HN Information Systems Inc., Billerica, Mass.

[21] Appl. No.: 219,958

[22] Filed: Jul. 15, 1988

[51] Int. Cl.$^5$ .................................................. G06K 15/00
[52] U.S. Cl. ............................................ 364/514; 364/900; 361/397; 340/825.16
[58] Field of Search .............. 324/158 F; 371/22.1, 371/8.2; 361/397; 364/550, 514, 900; 340/825.16, 825.01

[56] References Cited

U.S. PATENT DOCUMENTS

| | | | |
|---|---|---|---|
| 3,993,935 | 11/1976 | Phillips et al. | 361/397 |
| 4,700,348 | 10/1987 | Ise et al. | 340/825.01 |
| 4,750,136 | 6/1988 | Arpin et al. | 364/200 X |
| 4,835,737 | 5/1989 | Herrig et al. | 364/900 |

Primary Examiner—P. S. Lall
Assistant Examiner—S. A. Melnick
Attorney, Agent, or Firm—Gerald J. Cechony; John S. Solakian

[57] ABSTRACT

A real-time, high uptime transaction processing system includes many user terminals communicating with service providers via a communications network. A defective logic board is replaced or a board providing system expansion is installed without powering down the system by providing external auxiliary voltages and a reset signal to the board to put it in a passive state while it is being plugged into or unplugged from its backplane connector. Also under computer control the system is made inactive for a short period of time.

5 Claims, 8 Drawing Sheets

TRANSACTION PROCESSING

RELAY MODULE 2-2a

HOT EXTRACTION AND INSERTION OF LOGIC BOARDS IN AN ON-LINE COMMUNICATION SYSTEM

RELATED APPLICATIONS

The following U.S. patent applications are assigned to the same assignee and are related to the instant application.

1. Resilient Data Communications System by Lance McNally, Anthony J. Booth, and Peter Morley was filed on Dec. 23, 1987 and has Ser. No. 07/137,315, now U.S. Pat. No. 4,879,716.

2. Modem Backplane Interconnections by Lance McNally and Peter Morley was filed on 7/15/88 and has Ser. No. 07/219,941 now U.S. Pat. No. 4,831,634.

BACKGROUND OF THE INVENTION

1. Field of the Invention

This invention relates primarily to the field of data communications systems, and more specifically to the extraction and insertion of logic boards from a backplane without removing power from the system.

2. Description of the Prior Art

Data communication systems have a high uptime requirement. This is particularly true when a large number of terminals are connected into the system. Data communications systems have solved the high uptime need by employing multiple processors for communication line message processing. If one of the processors requires service, it is taken off line by maintenance personnel while the remaining processor or processors remain active. This assures that the system will remain operative but possibly with lower throughput.

Other systems are designed with redundant circuits which would automatically be switched out of the system when defective. The defective circuit would be replaced during the late night scheduled maintenance period when the entire system is shut down.

Accordingly, it is an object of the invention to have an improved data communication system with high uptime.

It is another object of the invention to have an improved data communication system with improved throughput.

It is still another object of the invention to have an improved data communication system with improved maintainability.

It is yet another objective of the invention to have an improved data communication with improved apparatus for replacing defective logic boards or installing new logic boards to expand the system without power shutdown.

SUMMARY OF THE INVENTION

A real time, high uptime transaction processing system includes many user terminals communicating with service providers via a communication network.

Groups of terminals are connected to the communications network through a Network Access Control (NAC) which includes a Communications Server Unit (CSU) and a computer. The CSU includes a number of logic boards namely relay module boards, system input output boards, a control module board, and network processor boards.

When a defective board is replaced or a board providing system expansion is installed, it is desirable to replace or add the board without powering the system down. Accordingly, a portable control panel (PCP) having a "hot insert" button is plugged into the master CSU processor board. Depressing the button causes the master CSU processor to notify the NAC computer that a board is to be replaced or inserted. The NAC computer instructs the master CSU processor to halt VME bus activity. When VME bus activity has stopped as evidenced by an indicator light on the CPU, an umbilical cord from a power supply is inserted into a connector on the failed board to provide an auxiliary source of power. The defective logic board is then physically removed from the system.

Since the defective logic board is held in a known powered up-state when it is unplugged from the backplane, there is no arcing at the backplane connector and no logic spikes generated to impact other logic boards.

The replacement board is installed by first inserting the umbilical cord into its connector signal to power it up in a known state and then inserting the board into its backplane connector.

The umbilical cord provides ground, a reset signal, and the logic board voltages +5 VDC and +/−12 VDC. The board therefore remains powered up while it is unplugged from its backplane connector. This eliminates arcing and spurious signals.

The umbilical cord is unplugged and the "hot insert" button is again depressed. This results in the computer notifying the network processor to restart the VME bus activity.

DESCRIPTION OF THE PREFERRED EMBODIMENT

Figure 1:
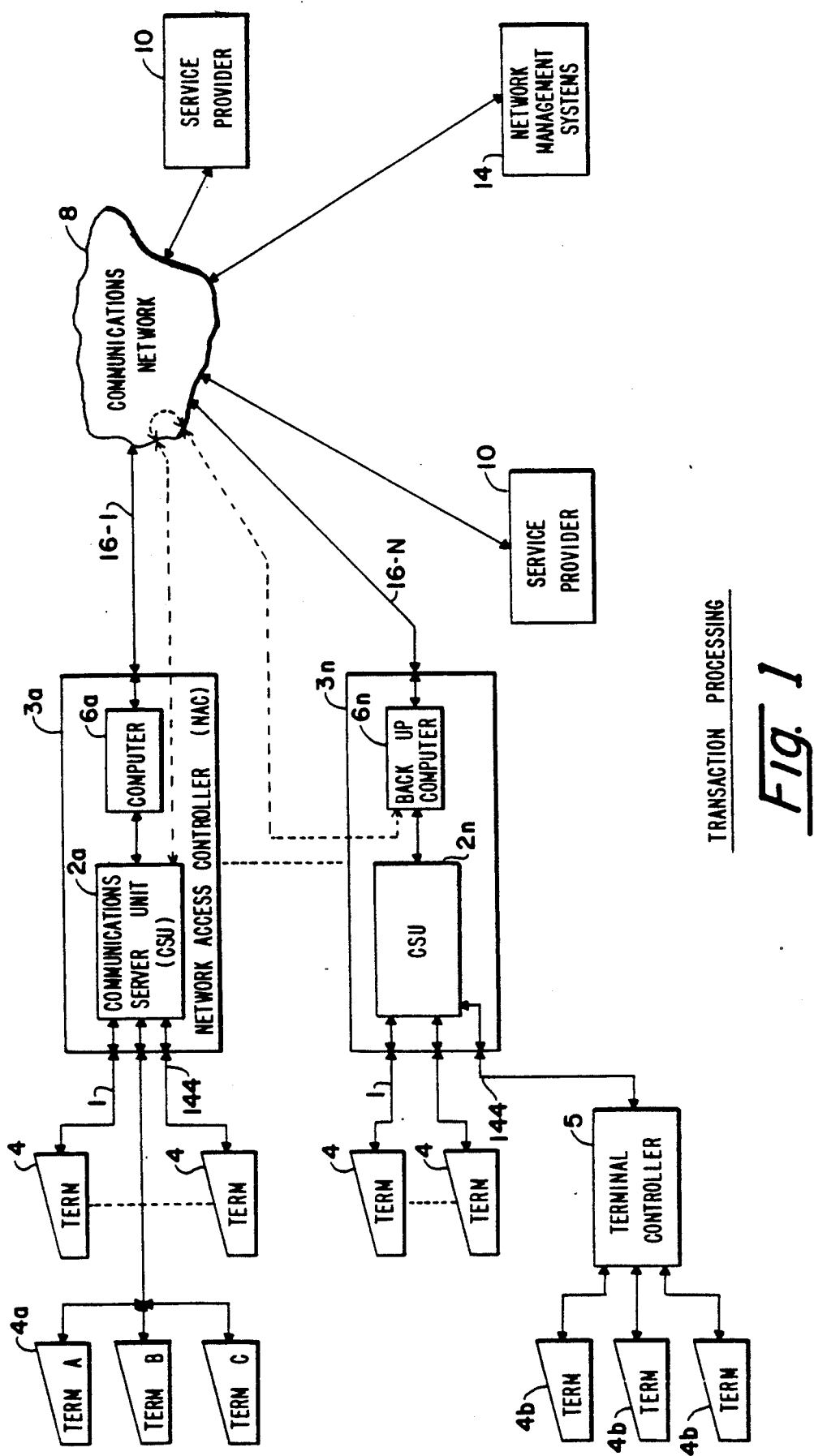
FIG. 1 shows an block diagram of a Transaction Processing System.

FIG. 1 is an overall block diagram of a Transaction Processing System 1 which includes a communication network 8 and a number of Network Access Controllers (NAC) 3a to 3n, each coupled to communications network 8 by communication lines 16-1 through 16-n respectively. Each NAC 3a through 3n includes a communication server unit (CSU) 2a through 2n and a general purpose computer 6a through 6n respectively. Each CSU 2a communicates with a number of user terminals 4 in point-to-point or multi-drop topologies, typically over a maximum of 144 lines. General purpose computer 6n is shown in FIG. 1 as a back-up computer to computer 6a. Terminal 4 may share a single communication line as terminals 4a or bid for a terminal controller 5 as terminals 4b.

Also coupled to communication network 8 are a number of service providers 10, and network management computer systems 14.

A message from the user terminal is presented to the NAC 3a which includes the identity of the originating user terminal 4, and information from the user which identifies the transaction and service provider. The message is acquired typically in a polled environment. The NAC 3a presents this information to communications network 8. The service provider 10 on recognizing its identity code or address accepts the information, processes the transaction and accordingly responds with a transaction back through the communication network 8, the NAC 3, to the originating terminal 4.

The NAC's 3a through 3n are the network nodes, geographically dispersed to provide local connections to the terminals 4 at the user's premises. The NAC's 3a through 3n are predominantly located in telephone exchanges but a small proportion may be located on the customer's premises, particularly when the premises serve many users.

The NAC 3a consists of two major functional units, the computer 6a and the CSU 2a. The computer 6a is responsible for the overall control of the NAC 3a, namely for relaying the information between the terminals 4 and the service providers 10 and for providing configuration and control information, such as detecting and reporting defective communication links.

The CSU 2a is constructed such that all critical components are duplicated. In the event of an internal failure, redundant components are activated to insure the continuation of service pending correction of the problem. However, the CSU 2a is dependent on the control services of computer 6a which initiates the corrective actions.

In the event of a failure in computer 6a or its connections to communications network 8, the CSU 2a may establish a connection to a remote computer 6n. The remote computer 6n may be part of another NAC 3n and be controlling its own local CSU 2n. Although a NAC 3a is normally comprised of a computer 6a and a CSU 2a, it will under failure conditions be made up of a local CSU 2a, a remote CSU 2n, and a remote computer 6n. The computer 6a software may support up to typically 12 CSU's 2a. It is therefore conceivable that the NAC 3a may be constructed with a single computer 6a and multiple CSU's 2a.

The Network Management Systems 14 control the operation of and provide facilities to aid in the management of the network 8. Systems 14 provides directory service by keeping information on the characteristics and addresses of the NAC 3a through 3n configurations, and the fall back address.

Figure 2:
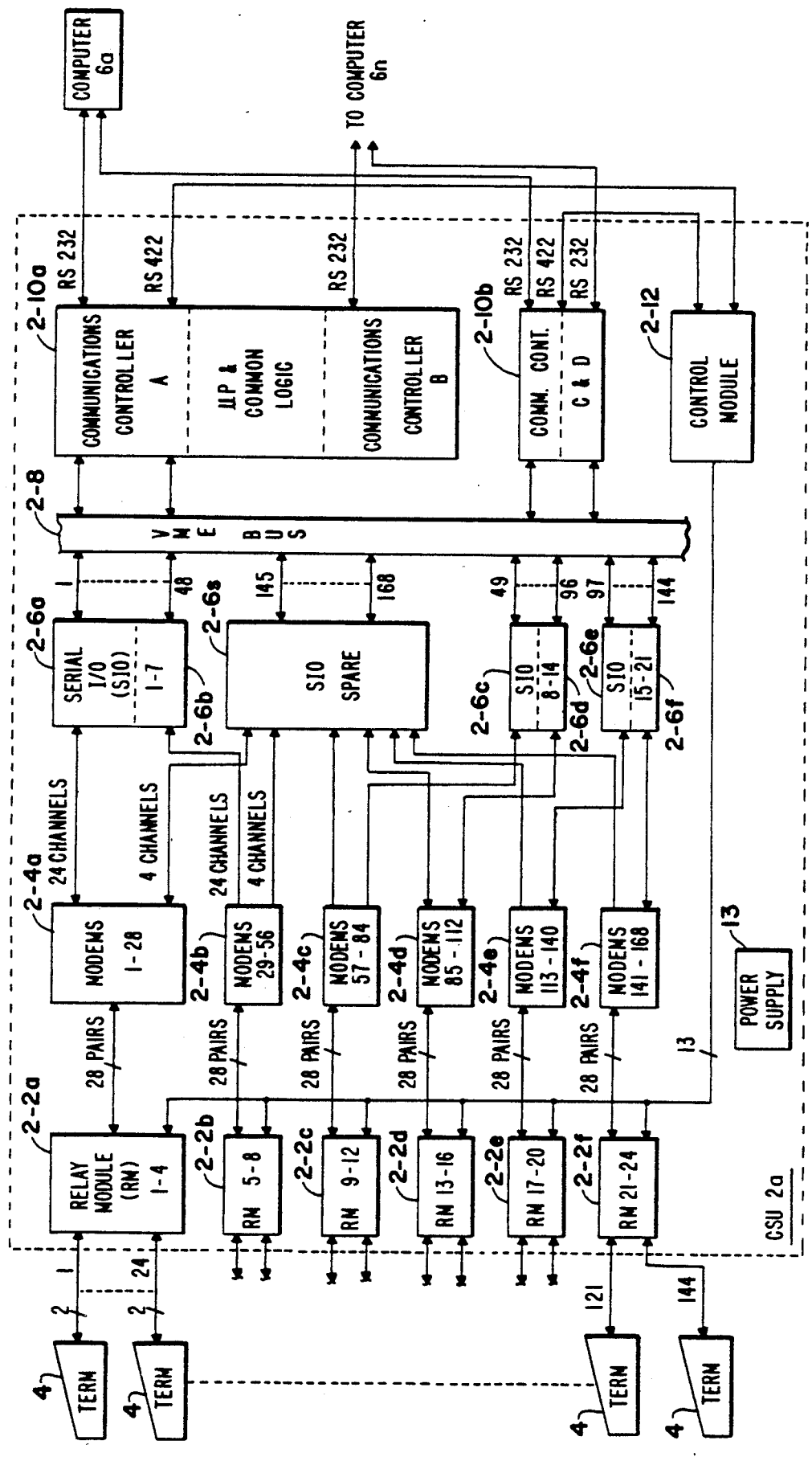
FIG. 2 is a block diagram of a Communication Service Unit.

FIG. 2 shows a block diagram of the CSU 2a. The 144 communication lines and associated terminals 4 are coupled to relay modules 2-2a through relay modules 2-2f respectively. Each relay module 2-2a through 2-2f is made up of four banks of relays. Each bank of relays services up to six communication lines. The twenty-four banks of relays therefore connect to the 144 communication lines. Each relay module 2-2a through 2-2f connects to a MODEM bank 2-4a through 2-4f respectively via 28 pairs of signal lines. Each MODEM bank 2-4a through 2-4f includes twenty-eight MODEMS, twenty-four MODEMS connected to the twenty-four communication lines and four MODEMS as spares.

Each MODEM module 2-4a through 2-4f is connected to its respective half of a serial I/O (SIO) 2-6a through 2-6f by 24 sets of channel signals, one set of signals for each MODEM. The four spare MODEM's from each MODEM module 2-4a through 2-4f are connected to spare SIO 2-6 for a total of 24 spare channels. Switching a spare MODEM into the system also switches in its spare SIO.

Each half SIO 2-6a through 2-6f converts the information on 24 channels received from the respective MODEM modules 2-4a through 2-4f to a parallel stream of characters which is placed on a VMEbus 2-8. The 16 signals on each full duplex channel includes a transmitted data signal and a received data signal, each data signal carrying a stream of data bits. The remaining signals are the normal handshaking signals of the CCITT V.24 recommendation.

Each pair of SIO's 2-6a and 2-6b, 2-6c and 2-6d, and 2-6e and 2-6f provides forty-eight fully programmable, full duplex multi-protocol serial data channels (of which only forty-eight are used).

Each MODEM module 2-4a through 2-4f in addition to providing 24 channels to their respective SIO's 2-6a through 2-6f, also provides four spare channels to a spare SIO 2-6s for a total of 24 channels. The SIO 2-6s in turn connects to the twenty-four channels to the VMEbus 2-8. SIO 2-6s includes SIO 7, 14, and 21 as spares.

Also connected to the VMEbus 2-8 are duplicate network processors 2-10a 2-10b. Network processor 2-10a includes a communication controller A, a communication controller B and a microprocessor and common logic for control of both communication controllers A and B. Communication controller A is connected to computer 6a and 6n (via RS232 communication A is connected to computer 6a and 6n) via RS232 communication interfaces. Communication controllers A and B are connected to a control module 2-12 via RS422 communication interfaces. Computer 6a assigns network processor 2-10a or 2-10b as a master If computer 6a determines that processor 2-10b as the master then it processes all data.

Control module 2-12 provides signals to switch a terminal 4 from a communication path that is inoperative to a spare communication path by activating a selected relay in a relay module 2-2a through 2-2f. Note that each relay module 2-2a through 2-2f includes four banks of relays. Each bank of relays may switch any one of six terminals 4 to a spare MODEM in MODEM modules 2-4a through 2-4f. Note that each of the MODEM modules includes twenty-eight MODEMS, twenty-four MODEMS for normal operation and four spare MODEMS for back-up operation.

Network processor 2-10b includes communication controller C and communication controller D as well as its microprocessor and common logic. Communication controller C is connected to control module 2-12 via a RS422 interface.

Power Supply 13 provides ground +5 VDC, +/−12 VDC, and −48 VDC to the logic components.

Figure 3:
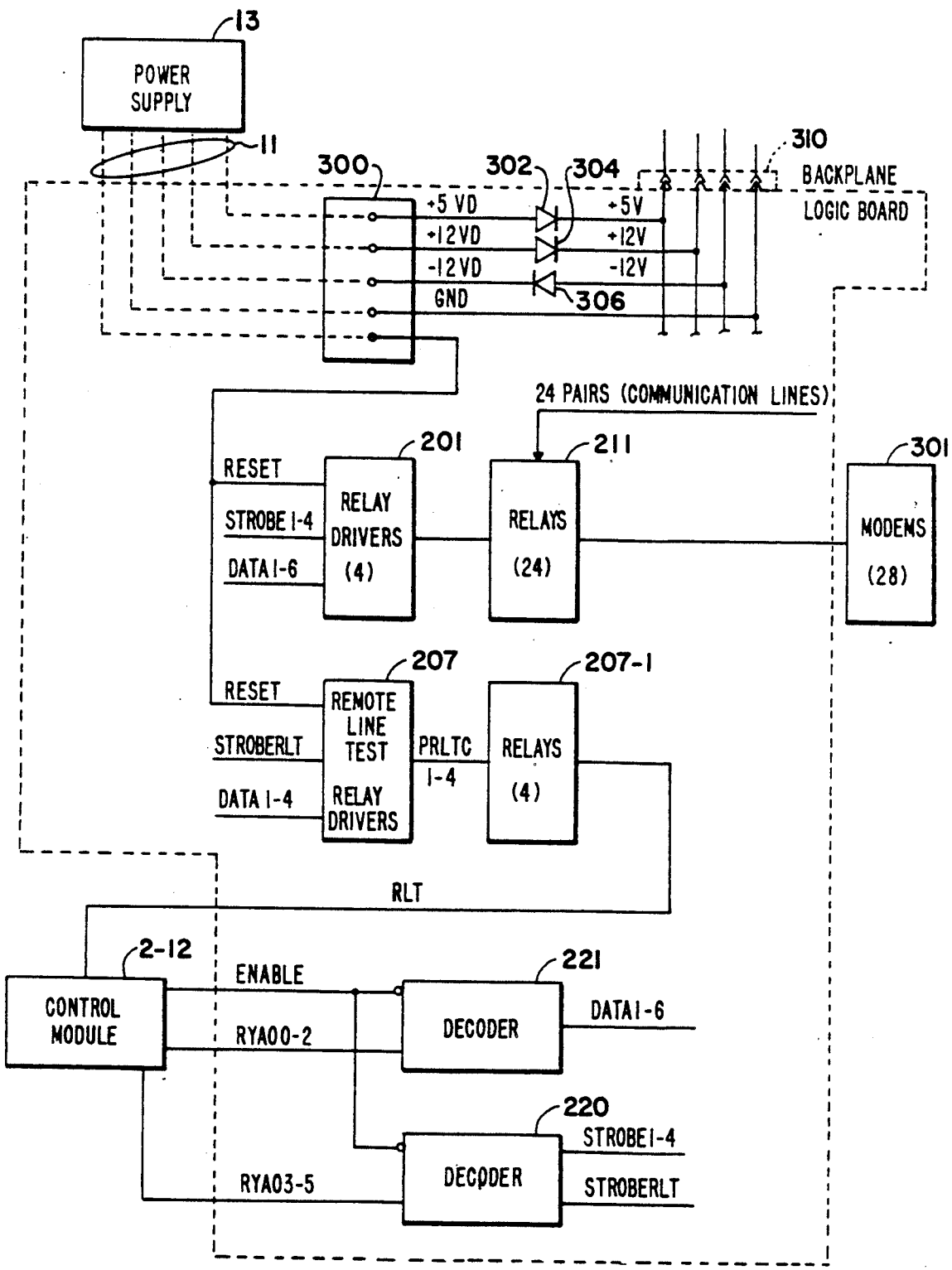
FIG. 3 is a block diagram of a relay module logic board.

FIG. 3 shows a typical relay module logic board 2-2a. During normal operation, 24 pairs of communication lines are connected to their respective MODEMS 301 through normally closed contacts of relays 211. If the system senses a disabled MODEM, then a relay driver in relay drivers 201 will energize the relay in relays 211 to switch the incoming communications line par to a spare MODEM of MODEMS 301. Note that relay drivers 201 typically includes six drivers, each driving one of six relays to control one of six pairs of communication lines.

Each of the four relay drivers of relay drivers 201 is enabled by a STROBE (STROBE 1, 2, 3, or 4) signal from a decoder 220, and the selected relay driver is activated by a DATA (DATA 1, 2, 3, 4, 5, or 6) signal from a decoder 221. Note that the relay drivers 201 are only activated to switch a communication line pair to a spare MODEM of MODEM 301.

When the system senses a bad communication line pair, the control module 2-12 enables decoders 220 and 221 to cause a switch to a spare MODEM via signals ENABLE and RYAD0-5. The control module 2-12 request a remote line test by enabling decoders 220 and 221 to generate signal STROBERLT and DATA 1, 2, 3, or 4 signals which are applied to remote line test relay driver 207 which select the 1 of 4 relays of Relays 207-1 via signals PRLTC1, 2, 3 or 4. This switches the communication line pair that is connected to the spare MODEM to the control module 2-12 which in turn tests the communication line pair.

When the relay module board 2-2a is to be removed or added, the umbilical cord 11 is plugged into a connector 300. This provides +5 VD, +12 VD, and −12 VD to diodes 302, 304, and 306 respectively, which isolates their respective voltages. Ground and a RESET signal are also provided. The RESET signal disables relay drivers 201 and 207. This provides external power to the relay module board 2-2a and also holds the logic in a known state so that when the edge connector 310 contacts break the normal power source to the board, and +5V and +/−12 V are still active, therefore no transient signals or arcing results.

The entire shutdown and startup sequences are described in connection with FIGS. 6 and 7.

Figure 4:
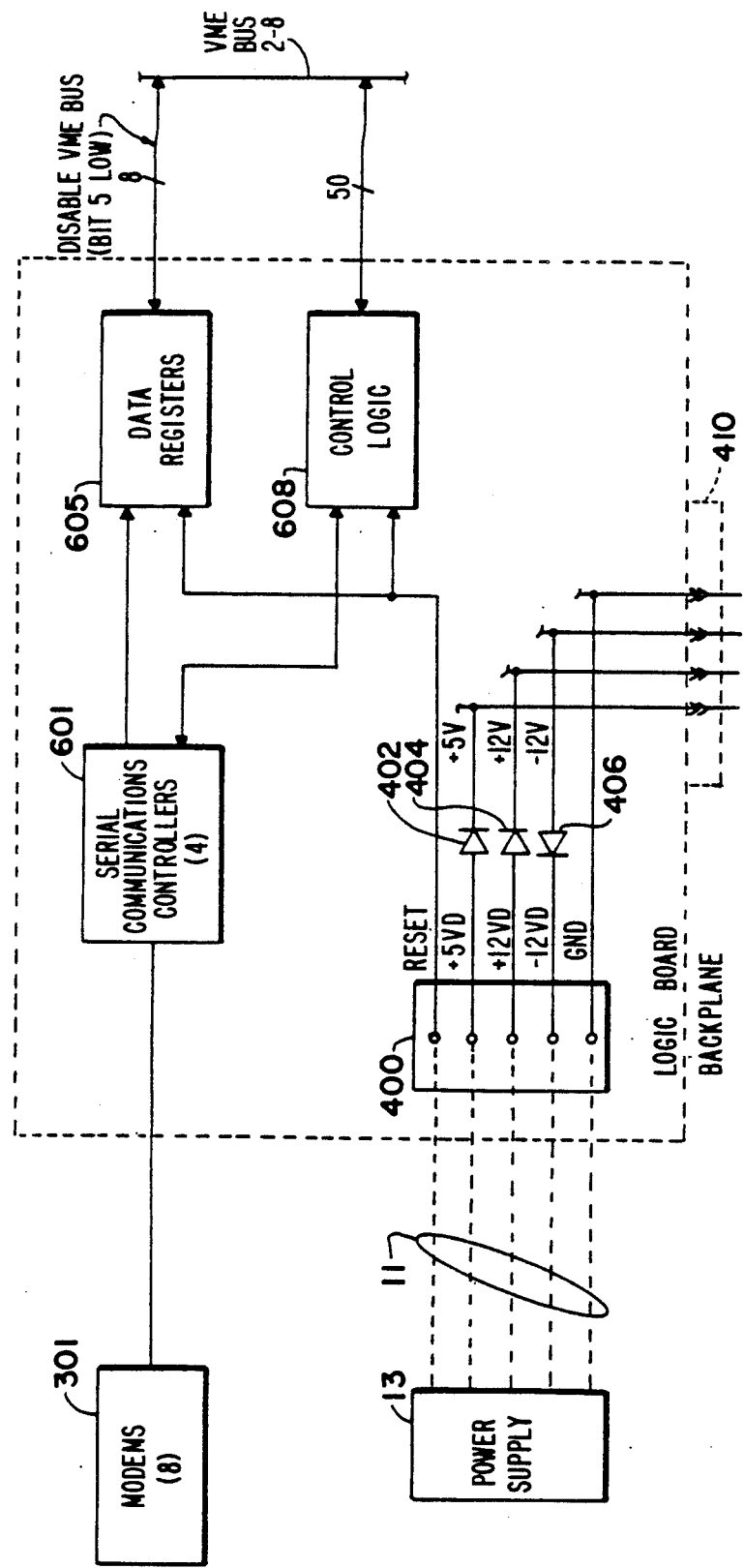
FIG. 4 is a block diagram of a serial input/output logic board.

FIG. 4 shows a typical SIO logic board 2-6a. During normal operations, V.24 communication signals are received from MODEMS 401 by Serial Communication Controllers 601. One SIO board 2-6a includes four dual channel Serial Communication Controllers 601 which communicates with the VME bus 2-8 via data registers 605. Control logic 608 provides address and control signals between the VME bus 2-8 and the Controllers 601.

The umbilical cord 11 from power supply 13 is plugged into connector 400 when an SIO board 2-6a is to be removed or inserted. The RESET signal applied to data registers 605 and control logic 608 suspend SIO operation by disabling the control logic 608 and forcing the Data Registers 604 output signals low. The VME bus 2-8 is disabled when bit 5 from the data registers 605 is low.

Again, edge connector 410 makes or breaks the normal +5 V and +/−12 V circuits. Since the SIO board 2-6a is held in a known state by ground, the +5 VD and +/−12 VD, through diodes 402, 406, and 408, respectively, and the RESET signal, no transient signals or arcing results.

Figure 5:
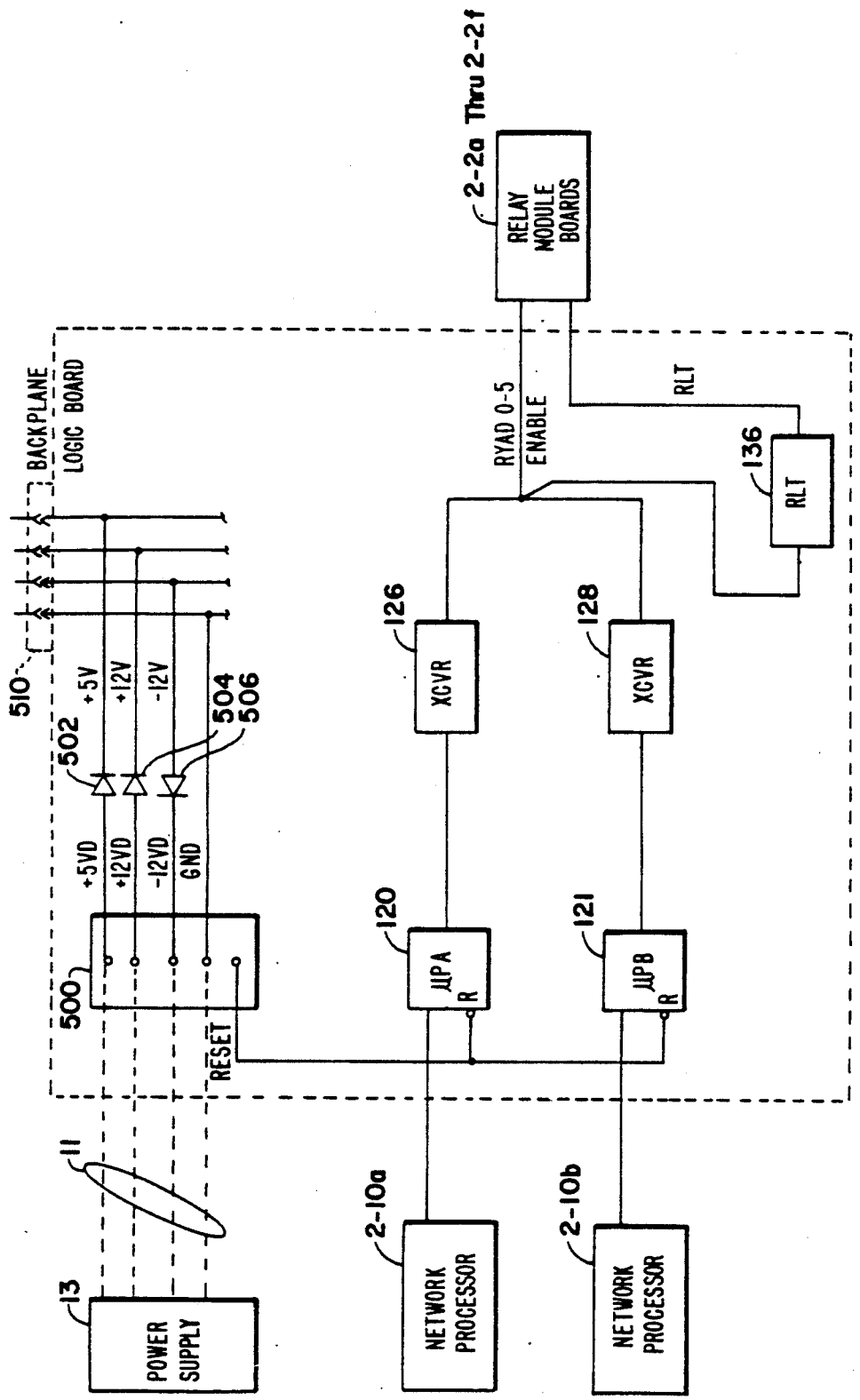
FIG. 5 is a block diagram of a control module board.

FIG. 5 shows the Control Module logic board 2-12. Network Processor 2-10a or 2-10b is designated as a master. The master sends signals to microprocessors 120 or 121 to indicate, for example, that a spare MODEM should replace an existing MODEM. Microprocessor 120 or 121 then sends the RYAD 0-5 signals and the ENABLE signals to the relay module boards 2-2a through 2-2f to energize a relay to switch a communication line signal pair to the spare MODEM.

The remote line testing function is enabled by sending the ENABLE and RAYAD 0-5 signals to RLT 136 which generates the RLT signal.

The umbilical cord 11 from power supply 13 is plugged into connector 500 and will hold the microprocessor 120 and 121 in a reset state. This forces the Control Module 2-12 into a known state with the components powered up. Here again the logic board may be removed or inserted without generating transient signals or arcing the pins of edge connector 510 since power is provided by +5 VD, +/−12 VDC, and ground through diodes 502, 504, and 506, respectively.

Figure 6:
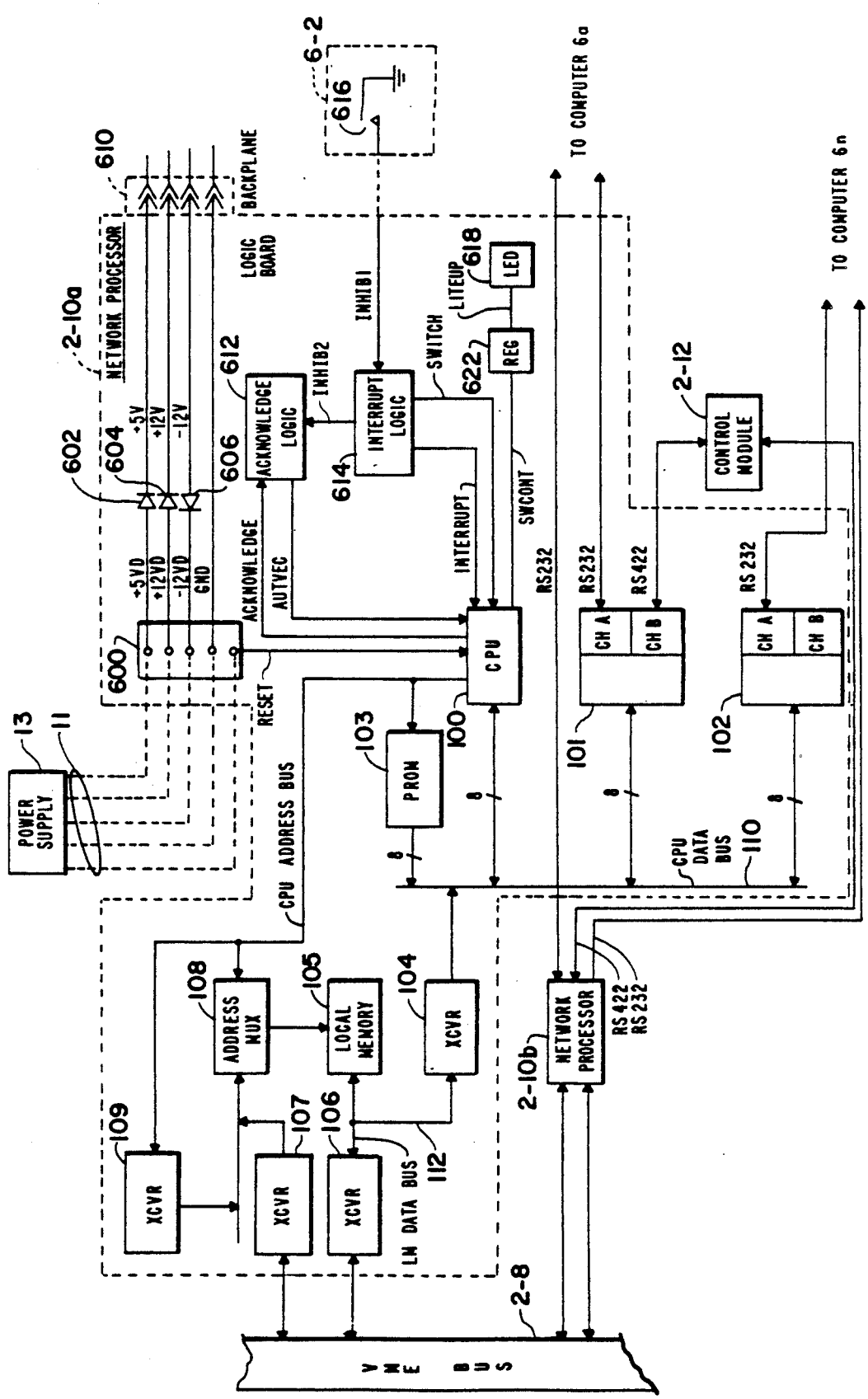
FIG. 6 is a block diagram of a network processor logic board.

FIG. 6 shows a block diagram of the network processor 2-10a which transfers information between the VME bus 2-8 and the computer 6a. Network processor 2-10b also transfers information between the VME bus 2-8 and the computer 6a.

Data from the VME bus 2-8 appears on the CPU data bus 110 via a transceiver 106 and a transceiver 104. The sixteen bit data is received by a CPU 100 and conditions the Serial Communication Controller (SCC's) 101 and 102 to receive the data for transfer to computer 6a over a channel A V.24 interface or transfer the data to the control module 2-12 over a balanced interface from channel B of SCC 101 and 102.

The CPU 100 bootstrap and quality logic tests are stored in PROM 103. The data received from the VME bus 2-8 may be stored in a local memory 105 via transceiver 106 at an address specified by the VME bus 2-8 address signals which are applied to local memory 105 via a transceiver 107 and an address MUX 108. The data is read out of local memory 105 by CPU 100 generating an address over CPU address bus 111 and address MUX 108. The address may also be placed on the VME bus 2-8 via a transceiver 109 and transceiver 107. The application software is stored in the local memory 105.

Data is received from computer 6 over the V.24 channel, and channel B of the SCC 101. It is transferred over CPU data bus 110 to local memory 105 and then to the VME bus 2-8 via transceiver 104 and transceiver 106.

Computer 6a is responsible for the overall control of the NAC 3a. At start-up, a microcode in PROM 103 supports a self test operation and enables itself to be booted from computer 6a. By loading programs into local memory 105, computer 6a directs all CSU 2a actions. If the CSU 2a loses contact with computer 6a, it will establish contact with computer 6n. In addition computer 6a controls the polling of communication lines provides configuration and control commands, such as resolving faults detected in the CSU 2a by switching spare equipment into active service to replace failed or failing equipment.

The operation of network processor 2-10a is described above. However, network processor 2-10b is a duplicate of network processor 2-10a . Both network processors 2-10a and 2-10b may share the load or any portions of the load. For example, network processor 2-10a may communicate with SIO 2-6a and 2-6b, and network processor 2-10b may communicate with SIO 2-6c, 2-6d, 2-6e, and 2-6f. Either network processor 2-10a or 2-10b may communicate with SIO 2-6a through 2-6f if one is out of service.

In normal operation, the primary role of the CPU 6a is to relay messages between the Terminals 4 and the service providers 10.

A control panel 620 including a "hot insert" pushbutton switch 616 is plugged into the master network 2-10a or 2-10b. The switch 616 is depressed a processor first time to signal the master network processor 2-10a or 2-10b that a logic board is to be removed or installed. The master network processor 2-10a or 2-10b initiates a software routine which in combination with a corresponding software routine which runs on the computer 6a shuts down the CSU 2a in an orderly fashion and will not, for a short period of time, typically one minute, receive further transactions from the terminals 4 or from the communications network 8. The logic to perform this function is shown in FIG. 6 and the matching software is shown in block diagram form in FIG. 7.

Referring to FIG. 6, depression of switch 616 generates a signal INHIBI which is applied to the interrupt logic 614 to generate an interrupt signal INTERRUPT and a SWITCH signal. The CPU 100 accepts the interrupt by generating an ACKNOWLEDGE signal which is applied to an acknowledge logic 612. Signal INHIB2 from interrupt logic 614 indicates a logic board replacement or installation option. The SWITCH signal conditions CPU 100 to control a bi-color LED 618.

Figure 7:
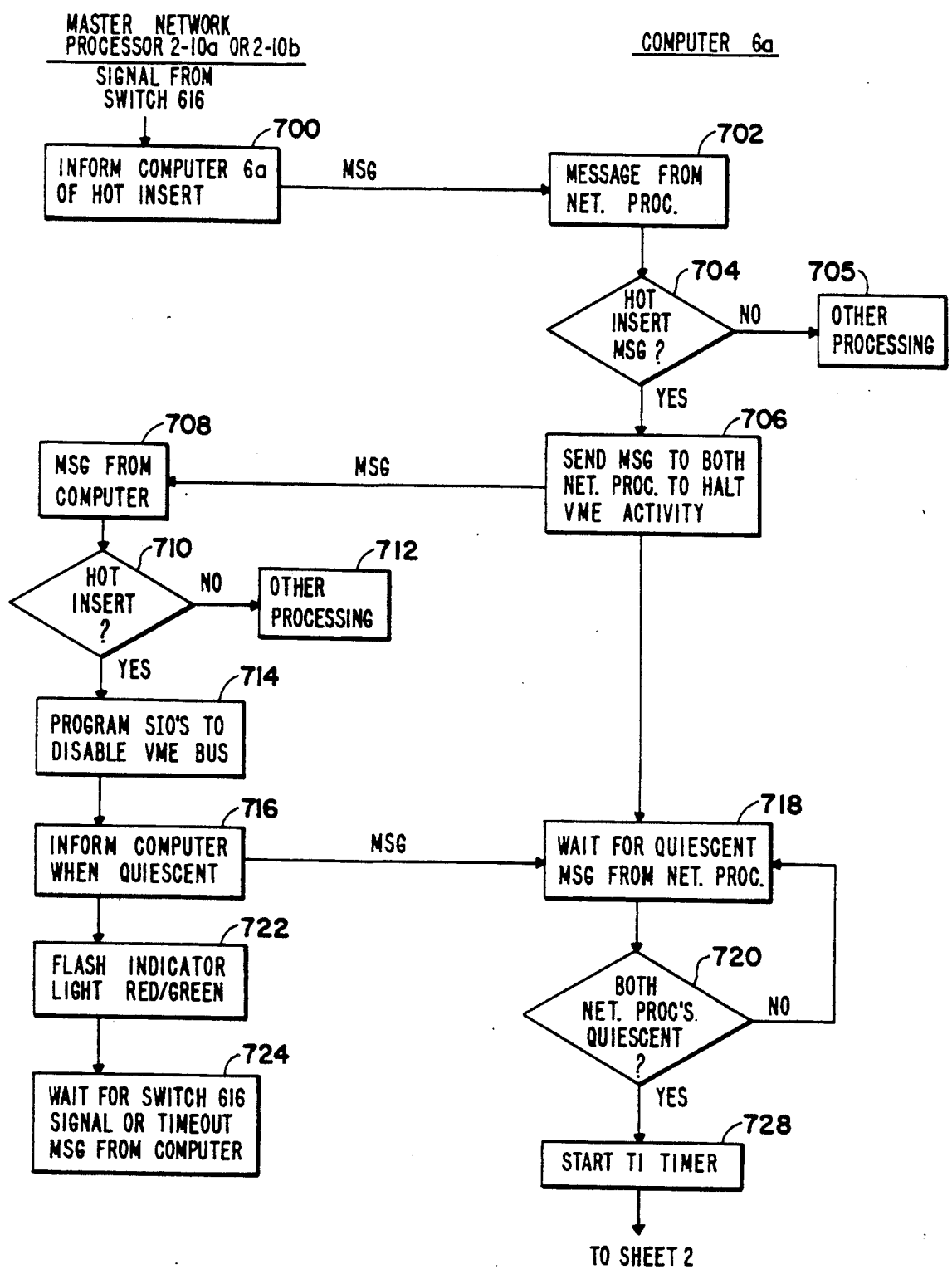
FIG. 7 sheets one (1) and two (2) show diagram of the software which controls the system during extraction and inserting of logic boards.

Acknowledge logic 612 then initiates an AUTVEC signal which causes the CPU 100 to initiate the software routine of FIG. 7. When the operation is halted as shown by LED 618 flashing between green to red, the umbilical cord 11 is plugged into connector 600. If the Slave Network Processor 2-10a or 2-10b or any other logic board is to be replaced, then the umbilical cord is plugged into their respective connector; in the case of the network processor logic board, connector 600. This provides power to the logic board after it is unplugged from connector 610 via diodes 602, 604, and 606 for +5 VDC, +12 VDC, and −12 VDC respectively as well as ground. Also signal RESET is applied to the reset terminal of CPU 100 to suspend operation.

When the logic board is replaced and the umbilical cord removed, the operator again depresses switch 616 to indicate to the system that the logic board is plugged into its backplane connector. Again, the INHIBI signal initiates a CPU 100 interrupt and the subsequent acknowledge of the interrupt. However, the system knows this is the second depression of switch 616 and the software takes action as described in FIG. 7.

When the system is shutting down the CPU 100 under software control, stores a SWCONT signal in a register 622 to cause the bi-color LED 618 to flash between green and red under control of signal LITEUP. When the system is restarted, the CPU 100, under software control, resets register 622 to cause the LED 618 to go to solid green. This indicates to the operator that the logic board replacement or installation operation is completed.

FIG. 7 is the block diagram showing the software flow through the master network processor 2-10a or 2-10b and the computer 6a.

When the switch 616 is depressed initially and the CPU 100 receives the AUTVEC signal as shown in FIG. 6, the master network processor 2-10a or 2-10b informs the computer 6a in block 700 that a logic board is about to be installed or replaced.

Block 702 receives the message and decision block 704 tests if this is a "hot insertion" message. If not, then the computer 6a branches to another processing routine in block 705.

If the message received from the Master Network is a "hot insertion" message, then in block 706 the computer 6a sends a message to the CSU Network Processors 2-10a and 2-10b to stop VME bus 2-8 activity.

Block 708 receives the message and in decision block 710 tests if the message relates to the "hot insertion" operation. If not, then block 712 provides another routine. If this is a "hot insertion" operation, then decision block 714 programs the SIO's 2-6 to disable the VME bus 2-8.

Block 716 then sends a message to the computer 6a indicating that the CSU 2a has stopped all activity and sets the LED 618 flashing in block 722. Meanwhile, block 718 and decision block 720 have been looping, waiting for the message that the CSU 2a has stopped all activity.

Block 728 starts a timer T1 in CPU 6a. The Master Network Processor 2-10a and 2-10b awaits either a signal for the switch 616 indicating that the logic board is inserted into the backplane or that the timer T1 has timed out.

In block 726, the master network processor 2-10a or 2-10b receives the second switch 616 signal, indicating that the new logic board is installed and the umbilical cord 11 removed, then a message is generated which is received by block 730. Block 730 calls block 732 if the message was received from block 726 indicating that the board is replaced and then "hot insertion" switch 616 was activated or the timer T1 timed out. The timer is usually set to restart functions in typically one minute whether or not the logic board was inserted. There is sufficient redundancy in the system to assure proper operation, even with a logic board inactive. This minimizes the time CSU 2a is off-line. Block 732 therefore informs both network processors 2-10a and 2-10b to resume VME bus 2-8 activity.

In block 734, the VME bus 2-8 and all SIO's are enabled. Then decision block 736 tests for errors. If errors were found, block 738 switches the error components out of the system and informs the computer 6a. If there are no errors, then block 744 waits for a message from the computer 6a.

Decision block 740 waits for a command from the operator to either perform other processing in block 748 or to reconfigure the CSU 2-2a. When block 744 receives the message from block 742, it calls on decision block 746 to either perform other processing in block 750 or to reconfigure and bring CSU 2-2a on-line in block 752 and turn the LED 618 to solid green.

While the invention has been shown and described with reference to the preferred embodiment thereof, it will be understood by those skilled in the art that the above and other changes in form and detail may be made therein without departing from the spirit and scope of the invention.

We claim:

1. A method of replacing a logic board plugged into a backplane connector in an on-line system without powering down, including the steps of:

A—inserting an end of an umbilical cord into a connector of said logic board to provide auxiliary logic power and a reset signal to disable the logic of said logic board;

B—actuating a hot insert switch to generate a first signal;

C—receiving said first signal by a first computer and sending a hot insert message to a second computer;

D sending a message by said second computer to said first computer to shut down all activity;

E—sending a message by said first computer to said second computer that all activity is stopped, said first computer setting an indicator to a first state;

F—starting a timer in said second computer;

G—removing said logic board from said backplane connector;

H—removing said umbilical cord end from said logic board and inserting it into a connector of a replacement logic board;
I—inserting said replacement logic board into said backplane connector;
J—removing said umbilical cord end from said connector of said replacement logic board;
K—said first computer awaiting said first signal generated by a second actuation of said hot insert switch indicating that said replacement logic board has been inserted into said backplane connector and said second computer awaiting a signal indicating a timeout;
L—responding by said first computer of said second occurence of said first signal or a message from said second computer indicating a timeout to restart all activity and setting said indicator to a second state.

2. A method of adding a logic board to a backplane connector in an on-line system without powering down including the steps of:
A—inserting an end of umbilical cord into a connector of said logic board to provide auxiliary logic power and a reset signal to disable the logic of said logic board;
B—actuating a hot insert switch to generate a first signal;
C—receiving said first signal by a first computer and sending a hot insert message to a second computer;
D—sending a message by said second computer to said first computer to shut down all activity;
E—sending a message by said first computer to said second computer indicating that all activity is stopped said first computer setting an indicator to a first state;
F—starting a timer in said second computer;
G—inserting said logic board into said backplane connector;
H—removing said umbilical cord end from said connector of said logic board;
I—said first computer awaiting by said first signal generated by a second actuation of said hot insert switch indicating that said logic board has been inserted into said backplane connector and said second computer awaiting by a signal indicating a timeout;
J—responding by said first computer to said second occurence of said first signal or a message from said second computer indicating a timeout to restart all activity and setting said indicator to a second state.

3. Apparatus for removing a logic board in an on-line system without powering down comprising:
a power supply for providing a first plurality of voltages and a second plurality of voltages with a reset signal,
a backplane coupled to said power supply for receiving said first plurality of voltages, said backplane including a plurality of connectors,
a plurality of logic boards each coupled to said backplane by one of said plurality of connectors for receiving said first plurality of voltages, one of said plurality of logic boards requiring replacement,
an umbilical cord coupled to said power supply and a first connector on said one of said plurality of logic boards for providing said second plurality of voltages with said reset signal,
said one of said plurality of logic boards including logic means responsive to said reset signal and said second plurality of voltages for remaining in a passive state when unplugged from said one of said plurality of connectors.

4. Apparatus for adding a logic board in an on-line system without powering down comprising:
a power supply for providing a first plurality of voltages and a second plurality of voltages with a reset signal,
a backplane coupled to said power supply for receiving said first plurality of voltages, said backplane including a plurality of connectors,
a plurality of logic boards each coupled to said backplane by one of said plurality of connectors for receiving said first plurality of voltages,
an umbilical cord coupled to said power supply and a first connector on said one of said plurality of logic boards to be plugged into said one of said plurality of connectors for providing said second plurality of voltages without reset signal,
said one of said plurality of logic boards including logic means responsive to said reset signal and said second plurality of voltages for remaining in a passive state when being plugged into said one of said plurality of connectors.

5. Apparatus for replacing a logic board in an on-line system without powering down comprising:
a power supply for providing a first plurality of voltages and a second plurality of voltages with a reset signal,
a backplane coupled to said power supply for receiving said first plurality of voltages, said backplane including a plurality of connectors,
a plurality of logic boards each coupled to said backplane by one of said plurality of connectors, said plurality of logic boards including a plurality of network processor boards, one of said plurality of network processor boards including a hot insert switch, and one of said plurality of logic boards requiring replacement,
an umbilical cord coupled to said power supply and a first connector on said one of said plurality of logic boards to be plugged into said one of said plurality of connectors for providing said second plurality of voltages with said reset signal, said one of said plurality of logic boards having means responsive to said reset signal and said second plurality of voltages for remaining in a passive state,
said one of said plurality of network processor boards including logic means responsive to a signal from said hot insert switch for generating a first message indicating that one of said logic boards requires replacement,
a central processor unit coupled to said logic means of said one of said plurality of network processor boards and having means for receiving said first message for generating a second message, said central processor unit further being responsive to said first message for starting a timer for generating a timer signal after a predetermined time,
said logic means of said one of said plurality of network processor boards being responsive to said second message for stopping bus activity,
said logic means being further responsive to a second occurrence of said signal from said hot insert switch indicating the replacement of said one of said logic boards and the removal of said umbilical cord for generating a third message,
said receiving means of said central processor unit being responsive to said third message if said timer signal was not received, or responsive to said timer signal if said third message was not received for generating a fourth message,
said logic means of being responsive to said fourth message for enabling said bus.

* * * * *